R. MAW.
CAR STOPPING DEVICE.
APPLICATION FILED APR. 7, 1909.

1,015,628.

Patented Jan. 23, 1912.

2 SHEETS—SHEET 1.

WITNESSES
Stuart R.W. Allen
O. R. McKenzie

INVENTOR
ROBERT MAW.
By Fred B. Silverstonhaugh
atty

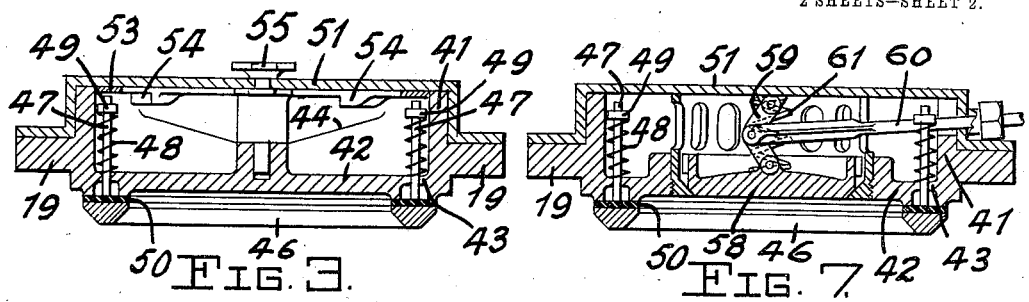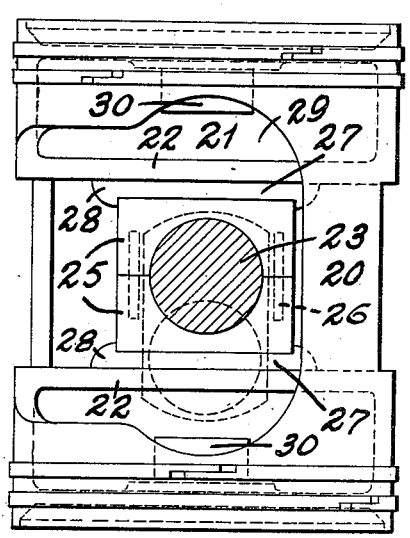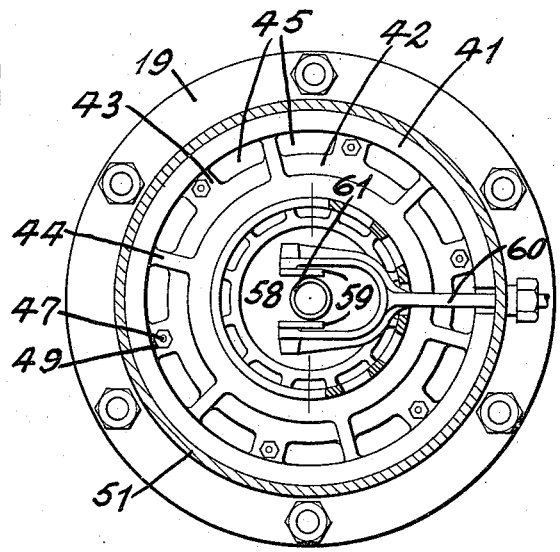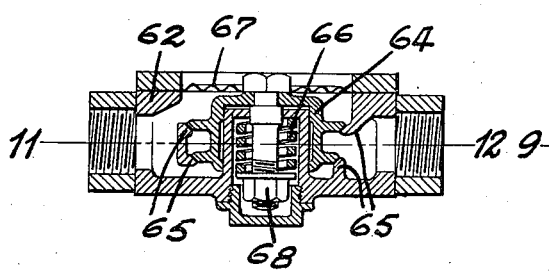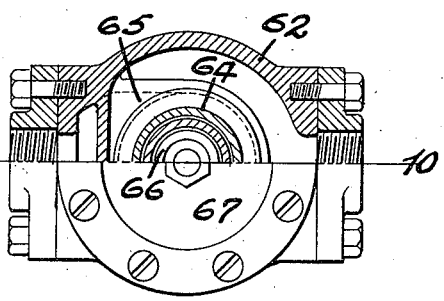

UNITED STATES PATENT OFFICE.

ROBERT MAW, OF MONTREAL, QUEBEC, CANADA, ASSIGNOR TO MAW BRAKES LIMITED, OF MONTREAL, CANADA, A CORPORATION OF CANADA.

CAR-STOPPING DEVICE.

1,015,628.   Specification of Letters Patent.   Patented Jan. 23, 1912.

Application filed April 7, 1909. Serial No. 488,451.

*To all whom it may concern:*

Be it known that I, ROBERT MAW, of the city of Montreal, in the Province of Quebec and Dominion of Canada, have invented certain new and useful Improvements in Car-Stopping Devices, of which the following is a full, clear, and exact description.

This invention relates to improvements in car stopping mechanism and the object is to provide a simple and efficient device which will stop a car without skidding the wheels and flattening the same.

A further object is to provide a car stopping device which eliminates the use of brake shoes and the consequent wear of the wheels and side stresses of the bearings.

To accomplish these objects I provide an air compressor driven from each axle and adapted to compress air in a receiver. An adjustable valve is located between the receiver and each compressor in order that the latter may attain their maximum braking effect independently of the pressure in the receiver. Unloading means are provided for the compressors whereby their braking effect may be regulated.

Figure 1:
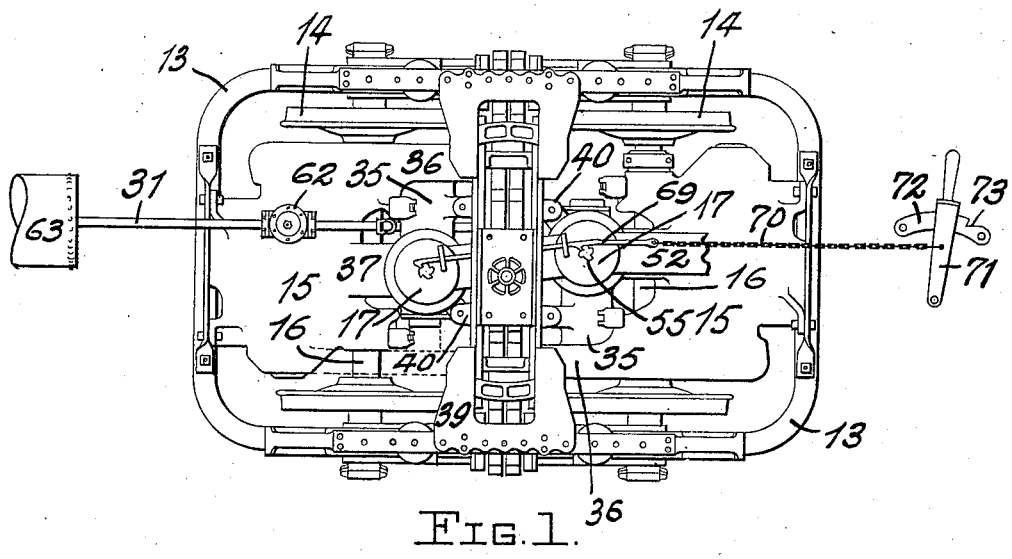
Figure 2:
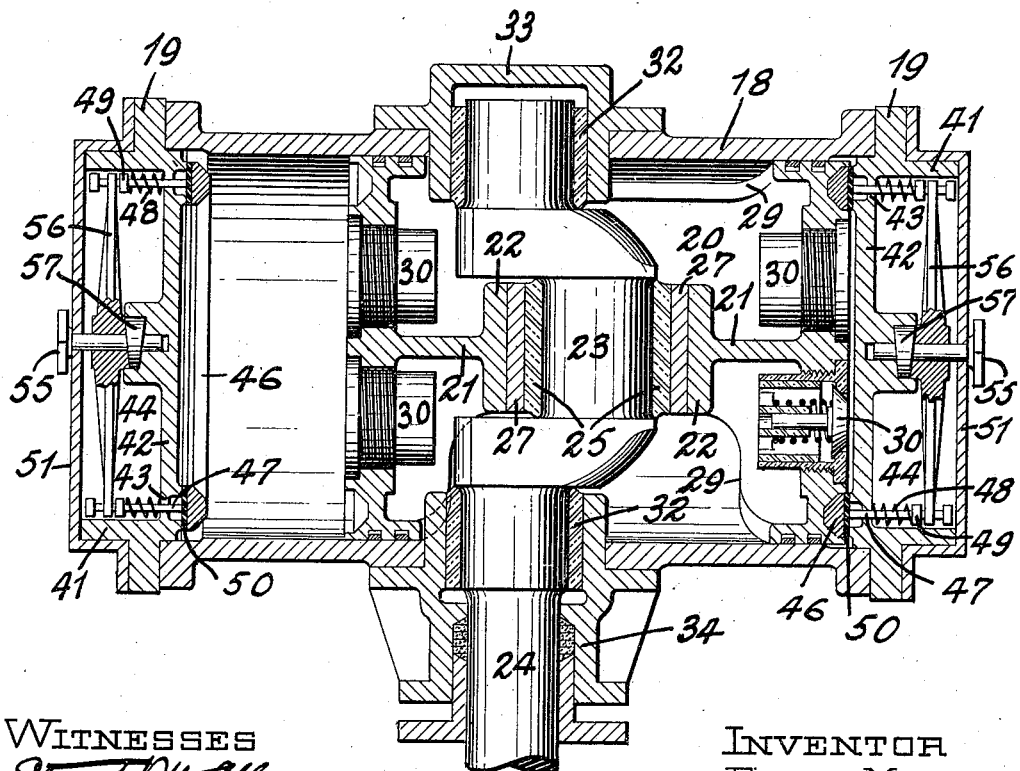

In the drawings which illustrate my invention:—Figure 1 is a plan view of an electric car truck showing the general arrangement of my invention as applied thereto. Fig. 2 is a sectional view of one of the compressors on a plane parallel with the axis of the shaft. Fig. 3 is a sectional view of one of the compressor heads and shows the preferred means of unloading the compressor. Fig. 4 is a plan view of the compressor piston. Fig. 5 is a sectional view of the pressure regulating valve on the line 9—10 of Fig. 6. Fig. 6 is a view of same half in plan and half in section on the line 11—12 of Fig. 5. Fig. 7 is a sectional view of a compressor head showing an alternative form of unloading device. Fig. 8 is a plan view of a compressor head.

In the above defined figures, 13 designates the frame work of an electric car truck mounted on the wheels 14 and driven by motors 15 geared to the axles 16 in the ordinary manner. Compressors 17 are mounted on the truck and may be geared to the axles thereof in any suitable manner. The compressor consists of a cylinder 18 having heads 19 and a reciprocating piston 20 therein. The piston is provided with a central web 21 which supports a pair of guides 22 extending diametrically across the piston. The crank 23 of the shaft 24 is journaled in a bearing 25 which is formed in two parts connected by dowel pins 26. Shoes 27 are placed above and below the bearing and engage the same by means of catches 28. When the bearing and its shoes are placed between the guides 22, they are as rigid as if formed in one piece as the dowel pins 26 prevent the halves of the bearing 25 from slipping sidewise and as the guides 22 hold the different parts together. The shaft 24 is inserted in the piston through openings 29 formed in the latter. When the shaft 24 revolves, the vertical motion of the crank 23 is transmitted to the piston, while the horizontal movement thereof is taken up by the bearing 25 traveling between the guides 22. A plurality of valves 30 are located in the end of the piston and lie flush with the outer end surface thereof. These valves may be of any suitable form and open inwardly so that a fluid compressed between the piston and the heads 19 will pass through the valves 30 into the piston and from thence will escape through the various openings therein to a delivery pipe 31 leading from the cylinder. The shaft 24 is journaled in suitable bearings 32, one of which is mounted in a cap 33 secured to the side of the cylinder and covering the end of the shaft. The other bearing is mounted in a stuffing box 34 through which the shaft passes. A casing 35 may be provided surrounding the shaft 24 and connecting with the casing 36 of the pinion on the car axle from which the compressor is driven. A bridge 37 may be formed over the car axle connecting the compressor to the motor casing, so that the weight of the compressor partially balances the weight of the motor. The compressor may be further suspended from the truck bolster 39 by any suitable spring suspension indicated at 40, thus taking a large proportion of the dead weight of the motor off the axles.

The compressor heads 19 comprise an outer ring 41 which is bolted to the cylinder 18 and a central disk 42 connected to the ring 41 by a plurality of bridges 43 and strengthening webs 44. Air is drawn into the compressor through the apertures 45 between the bridges and webs. An annular valve 46 is located on the inner surface of the head 19 so as to close the opening 45. The valve 46 is supported by a plurality of pins 47 which extend through the bridges 43. Helical springs 48 surround the pins 47 and are compressed between the bridges 43 and nuts 49 on the pins 47 so as to normally maintain the valve 46 in contact with the head. A facing 50 of any suitable resilient material is provided for the valve 46 in order to insure an airtight joint between it and the head 19. A false cover 51 is placed over the head 19 and from this cover a conduit 52 extends to any desired portion of the car in order that the air drawn into the compressor may be free from dust and grit.

For unloading the compressor, I prefer to use a ring 53 having a plurality of cams 54 mounted on the under surface thereof, said cams corresponding in number with the pins 47. The ring 53 is located within the false cover 51 and operated by a ratchet wheel 55. When the ring 53 is rotated by the ratchet wheel 55 through any predetermined portion of a revolution, the cams 54 engage the extremities of the pins 47 and lift the valve 46 from its seat so that the air drawn into the cylinder through the apertures 45 is forced out on the return of the piston through the same apertures, without being compressed. By again shifting the ring 53 in the same direction as before, the cams 54 pass out of engagement with the pins 47, allowing the valve 46 to close and prevent the escape of air from the cylinder.

Various other forms of unloading devices may be employed such as that shown in Fig. 2, wherein a spider 56 is provided adapted to be raised by a revolving cam 57 to lock the valves 46 in closed position so that the piston will travel in a vacuum. A further form of unloading device is shown in Fig. 7 and comprises a large disk valve 58 located in the center of the head and normally maintained closed by means of a toggle 59 operated by a tension rod 60. When the toggle 59 is released, the valve 58 is raised by a spring 61 so that the air will enter and leave the cylinder freely. This latter form of unloading device differs from the two former ones in that it is independent of the valve 46. A spring loaded valve 62 is located in the discharge pipe between the compressor and the air receiver 63. This valve comprises a head 64 resting on two seats 65 and held thereon by a heavy spring 66 and a diaphragm 67. The loading of the spring may be adjusted by means of a nut 68. The air enters from the compressor, and is compelled to lift the head 64 against the resistance of the spring 66 and diaphragm 67 before it can pass on to the receiver. Supposing that the spring is loaded sixty pounds, the compressors will pump a pressure of sixty pounds in the discharge pipe between themselves and the valve 62, irrespective of the pressure in the air receiver.

It will be seen that this insures the immediate braking effect of the compressors, as the valve 62 maintains a constant pressure of sixty pounds in the discharge pipe and against the ends of the piston. Any surplus over the sixty pounds raises the valve and goes to increase the pressure in the receiver 63.

The unloading devices are operated by pawl bearing rods 69 which engage the ratchet wheels 55 and operate them simultaneously. All the rods 69 on a car may be connected to a single chain 70, the tension of which the motorman controls by a small lever 71 engaging a quadrant 72, having a notch 73 therein in which the lever 71 engages to maintain the tension of the chain 70.

The operation of the device is simple and will be readily understood from the foregoing description. The compressor is driven continuously while the car is in motion but is rendered inoperative by means of the unloading device except when it is desired to stop the car. By regulating the unloading device, any desired resistance to the revolution of the wheels may be offered by the compressor, and as such resistance is transmitted to the axle equally throughout all parts of its revolution, there will be no violent side stresses on the bearings. By reason of the valve 62, the maximum of pressure is attained in the discharge pipe almost instantly so that the full braking effect of the compressors is immediately available without the necessity of waiting for the pressure to rise in the receiver 63. The braking effect may then be controlled as desired by the unloading device.

Having thus described my invention, what I claim is:—

1. In a car stopping device, the combination with car trucks, of continuously running air compressors driven from the axles thereof, barrel pistons having valves in the ends of same, crank shafts passing through said compressors and pistons, means for unloading the compressors while the car is running, means for disengaging said unloading means to stop the car, and means for placing a predetermined load on the compressors.

2. In a car stopping device, the combination with a car and trucks, of air compressors geared to the axles thereof, a reservoir connected to the compressors, valves in said compressors, cams carried by said compressors for maintaining the valves open, mechanism for closing said valves to stop the car, and a spring loaded valve between the reservoir and compressors, substantially as described.

3. In a car stopping device, the combination with car trucks, of continuously running air compressors geared to the axles thereof, valves in the covers of said compressors, annular cams carried by said covers, a reservoir connected to the compressor, and a spring loaded valve between the reservoir and the compressors whereby the latter operate against a constant pressure regardless of the reservoir pressure.

4. In a car stopping device, the combination with car trucks, of compressors driven from the axles thereof, having annular valves in the heads thereof, barrel pistons having valves in the ends thereof, crank shafts passing through said compressors and pistons, means connecting said pistons and shafts, and means for maintaining said annular valves open to unload the compressors.

5. In a car stopping device, the combination with car trucks, of compressors driven from the axles thereof having annular suction valves in the heads thereof, barrel pistons, discharge valves in the ends of said pistons, opening thereinto, crank shafts passing through said compressors and pistons, means connecting the pistons and cranks, covers for the compressor heads, annular cams carried by said covers for maintaining the suction valves open, means for operating said cams simultaneously, suction pipes leading into said compressor head covers, a reservoir, a delivery pipe connecting the compressors to the reservoir, and a spring loaded valve in said pipe for maintaining a constant load on the compressors independent of the pressure in the reservoir.

In witness whereof I have hereunto set my hand in the presence of two witnesses.

ROBERT MAW.

Witnesses:
 C. W. TAYLOR,
 E. R. McKENZIE.

Copies of this patent may be obtained for five cents each, by addressing the "Commissioner of Patents, Washington, D. C."